US012597744B2

(12) United States Patent
Anma et al.

(10) Patent No.: US 12,597,744 B2
(45) Date of Patent: Apr. 7, 2026

(54) CONNECTOR HAVING A CRIMPED PART FOR CRIMPING TO AN OUTER CONDUCTOR OF A CABLE

(71) Applicant: Yazaki Corporation, Tokyo (JP)

(72) Inventors: Hikaru Anma, Shizuoka (JP); Minami Soga, Shizuoka (JP); Isao Kameyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 302 days.

(21) Appl. No.: 18/505,692

(22) Filed: Nov. 9, 2023

(65) Prior Publication Data

US 2024/0195132 A1 Jun. 13, 2024

(30) Foreign Application Priority Data

Dec. 7, 2022 (JP) ................................ 2022-195793

(51) Int. Cl.
*H01R 24/40* (2011.01)
*H01R 9/05* (2006.01)

(52) U.S. Cl.
CPC ........... *H01R 24/40* (2013.01); *H01R 9/0518* (2013.01)

(58) Field of Classification Search
CPC .......... H01R 24/40; H01R 24/48; H01R 4/18; H01R 9/0518; H01R 24/38
See application file for complete search history.

(56) References Cited

U.S. PATENT DOCUMENTS

| | | | |
|---|---|---|---|
| 6,200,162 | B1 | 3/2001 | Aoyama et al. |
| 6,206,727 | B1 | 3/2001 | Aoyama et al. |
| 6,210,223 | B1 | 4/2001 | Aoyama et al. |
| 8,998,641 | B2 | 4/2015 | Kanda |
| 2013/0344738 | A1 | 12/2013 | Kanda |

FOREIGN PATENT DOCUMENTS

| | | | | |
|---|---|---|---|---|
| JP | 2000-164263 | A | | 6/2000 |
| JP | 2014-002974 | A | | 1/2014 |
| JP | 2020057493 | A | * | 4/2020 |

OTHER PUBLICATIONS

English Translation of JP 2020-057493 A (Year: 2020).*

* cited by examiner

*Primary Examiner* — Sean Gugger
(74) *Attorney, Agent, or Firm* — Banner & Witcoff, Ltd.

(57) ABSTRACT

There is provided a connector that is attachable to an end of a cable, the cable including an inner conductor, an insulator that covers the inner conductor, and an outer conductor that covers the insulator. The connector includes: an inner terminal attachable to the inner conductor; an insulating member that covers the inner terminal; and an outer terminal that covers the insulating member. The outer terminal includes: a crimping piece configured to be crimped to the outer conductor; and a folded piece configured by folding back a part of the crimping piece.

5 Claims, 5 Drawing Sheets

CONNECTOR HAVING A CRIMPED PART FOR CRIMPING TO AN OUTER CONDUCTOR OF A CABLE

CROSS-REFERENCE TO RELATED APPLICATIONS

This application is based on and claims priority under 35 USC 119 from Japanese Patent Application No. 2022-195793 filed on Dec. 7, 2022, the contents of which are incorporated herein by reference.

TECHNICAL FIELD

The present disclosure relates to a connector.

BACKGROUND ART

Various techniques relating to improvement of holding strength of a connector for holding a cable have been proposed. JP2000-164263A discloses a terminal that can ensure electrical connection.

In the terminal, a folded portion is placed on a crimping bottom portion of an outer terminal while a bottom projection at the crimping bottom portion bites into the folded portion. A first crimping piece is brought into close contact with an outer periphery of the folded portion and an upper projection bites into a sheath of the folded portion. Thereafter, a second crimping piece is brought into close contact with the outer periphery of the folded portion and an end thereof is placed on that of the first crimping piece and is crimped. An outer crimping portion squeezes the sheath and is crimped while being held in close contact with the folded portion, and the two projections bite into the sheath of the folded portion with the folded portion crimped in between.

JP2014-002974A discloses a low-cost end structure of electric wire that has a shielding effect. This end structure is provided with an insulator around an inner conductor, and a shielded connector is connected to an end of an electric wire including a shield layer made of a metal foil and a sheath layer made of a resin tape that are wound around the insulator in order. The shielded connector includes an inner terminal to be connected to the inner conductor, an insulating member that covers the inner terminal, an outer terminal that covers the insulating member, and a crimping member that crimps the outer terminal to the shield layer. The outer terminal includes a connection piece along an outer periphery of the insulator. The crimping member is crimped from a periphery of the shield layer, and the shield layer and the connection piece are crimped and connected.

In the related art, a part (for example, a projection) of a connector is brought into contact with a cable and crimped to hold the cable. However, a holding force may be small when the fastening strength by crimping is not large.

SUMMARY OF INVENTION

The present disclosure provides a connector having improved cable holding strength.

According to an illustrative aspect of the present disclosure, a connector is attachable to an end of a cable, and the cable includes an inner conductor, an insulator that covers the inner conductor, and an outer conductor that covers the insulator. The connector includes: an inner terminal attachable to the inner conductor; an insulating member that covers the inner terminal; and an outer terminal that covers the insulating member. The outer terminal includes: a crimping piece configured to be crimped to the outer conductor; and a folded piece configured by folding back a part of the crimping piece.

The present disclosure is briefly described above. Details of the present disclosure can be clarified by reading modes for carrying out the disclosure described below with reference to the accompanying drawings.

DESCRIPTION OF EMBODIMENTS

First Embodiment

Figure 1:
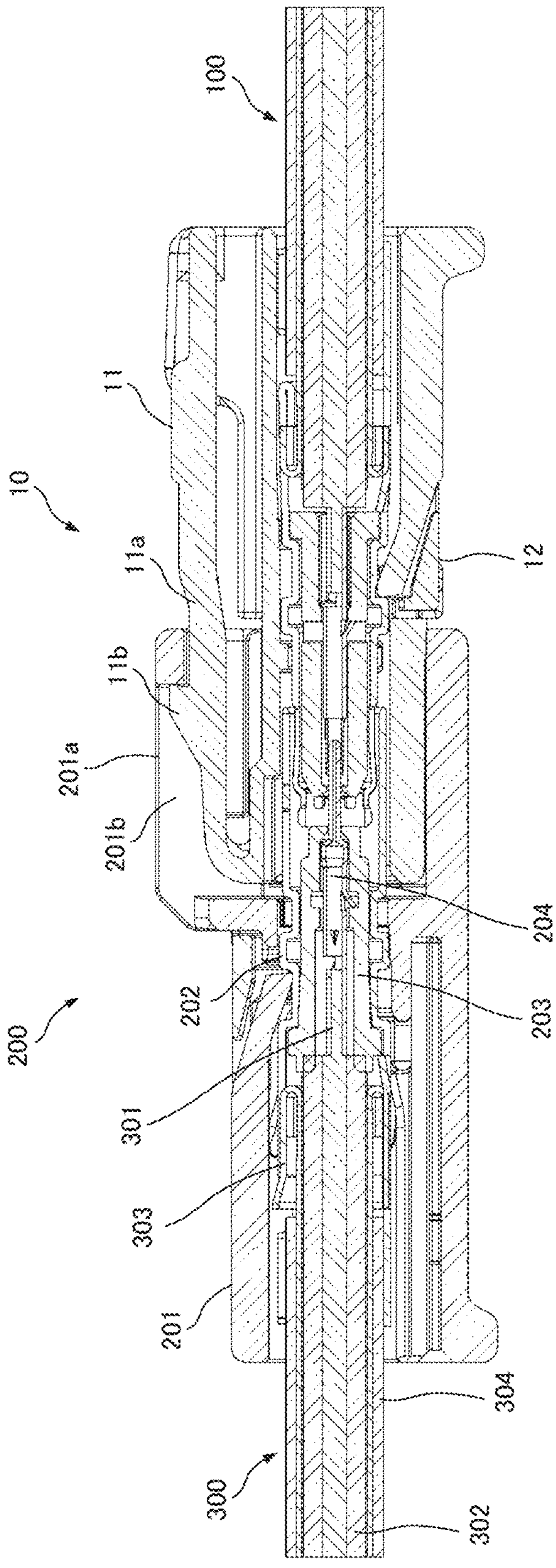
FIG. 1 is a longitudinal sectional view of a female connector and a male connector in a fitted state according to a first embodiment of the present disclosure.

Hereinafter, a female connector (also simply referred to as "connector") 10 according to a first embodiment of the present disclosure will be described with reference to the drawings. As shown in FIG. 1, the female connector 10 according to the present embodiment is connected to a distal end of a coaxial cable 100, and is fitted to a male connector 200 that is a counterpart connector. The male connector 200 is connected to a distal end of a coaxial cable 300 and is fitted to the female connector 10. By this fitting, the coaxial cable 100 of the female connector 10 and the coaxial cable 300 of the male connector 200 are electrically connected. The female connector 10 and the male connector 200 have a shielding function of reducing noise of electromagnetic waves entering from outside through the coaxial cables 100 and 300. The female connector 10 and the male connector 200 serve as, for example, high-frequency connectors that can transmit high-frequency signals.

First, the male connector 200 that is the counterpart connector and the coaxial cable 300 that transmits electric signals will be described. The male connector 200 includes a male outer housing 201, a male outer terminal 202, a male inner housing 203, and a male inner terminal 204.

The resin-made male outer housing 201 constitutes an exterior portion of the male connector 200, and has a hood portion 201*a* and a lock hole 201*b*. The hood portion 201*a* is a portion having a slightly larger diameter in the male outer housing 201. The rectangular lock hole 201*b* is formed in an upper surface of the hood portion 201*a*. The hood portion 201*a* and the lock hole 201*b* are portions that serve to fit with the female connector 10 as described later.

On an inner surface of the male outer housing 201, the male outer terminal 202, the male inner housing 203, and the male inner terminal 204 are arranged in this order from an outer side toward a center in a radial direction orthogonal to a longitudinal direction of the male connector 200. As described later, the metal-made male outer terminal 202 serves to ground electromagnetic wave noise entering from outside through the coaxial cable 300. The resin-made male inner housing 203 serves as an insulating member that electrically insulates the metal-made male outer terminal 202 from the metal-made male inner terminal 204.

The metal-made male inner terminal 204 is disposed at a radial center of the male connector 200, and is attached to a core wire 301 that is an inner conductor of the coaxial cable 300. The male inner terminal 204 transmits electric signals from the core wire 301 to the female connector 10 as described later.

Figure 2:
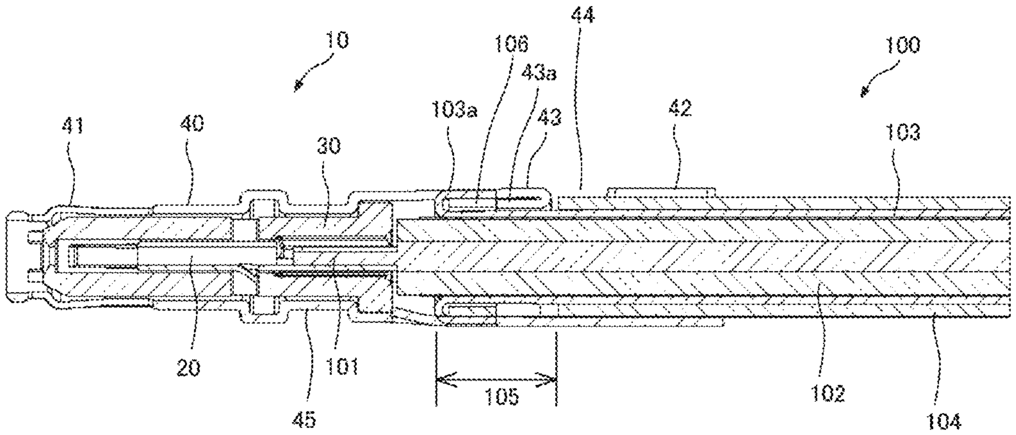
FIG. 2 is a longitudinal sectional view of the female connector according to the first embodiment.
Figure 3:
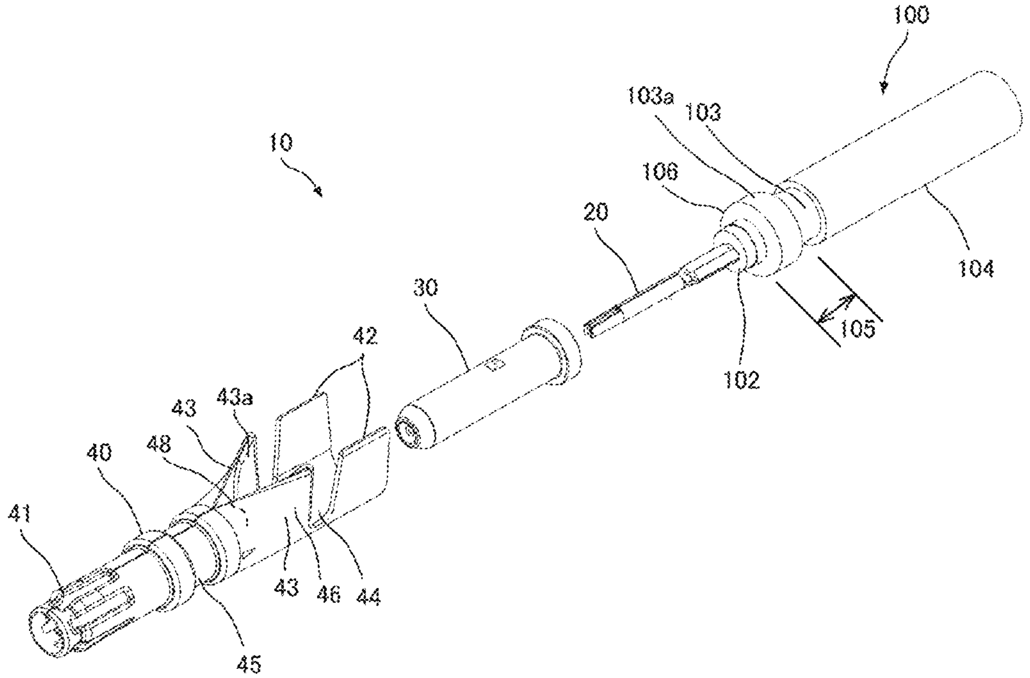
FIG. 3 is an exploded perspective view of the female connector according to the first embodiment.

As shown in FIGS. 1 to 3, the female connector 10 according to the first embodiment includes a female outer housing 11, a female outer terminal (also simply referred to as "outer terminal") 40, a female inner housing (also simply referred to as "insulating member") 30, and a female inner terminal (also simply referred to as "inner terminal") 20.

As shown in FIG. 1, the resin-made female outer housing 11 constitutes an exterior portion of the female connector 10, and has a lock arm 11*a* and a lock projection 11*b* that serve to fit with the male connector 200. The lock arm 11*a* has a cantilever shape, and the lock projection 11*b* is formed thereon. A user lowers the lock arm 11*a* while pressing an end portion of the lock arm 11*a*, and inserts the female connector 10 into the hood portion 201*a* of the male connector 200. When the user returns the lock arm 11*a* to an original position after the insertion, the lock projection 11*b* engages with the lock hole 201*b*, and the female connector 10 and the male connector 200 are fitted to each other.

The female outer housing 11 is attached with a spacer 12 on a lower side of the female outer housing 11. In an assembling process, the spacer 12 is locked from the lower side of the female outer housing 11, so that the female outer terminal 40 and the like inside the female outer housing 11 can be locked.

FIG. 2 shows a cross section of the female connector 10 in a state in which the female outer housing 11 is removed. An assembly in this state may be referred to as "female connector". The female connector 10 is a connector that is attached to an end of the coaxial cable 100. The coaxial cable 100 is a cable including a core wire 101 that is an inner conductor, an insulator 102 covering the core wire 101, a braid 103 that is an outer conductor covering the insulator 102, and an outermost sheath 104. The braid 103 is connected to a ground wire (not shown), for example, and serves as a ground. Similar to the coaxial cable 100, the coaxial cable 300 in FIG. 1 also includes a core wire 301, an insulator 302, a braid 303, and a sheath 304.

The female connector 10 includes a configuration in FIG. 2 in addition to the female outer housing 11 shown in FIG. 1 only. That is, the female connector 10 includes the female inner terminal 20 attached to the core wire 101 of the coaxial cable 100, the female inner housing 30 covering the female inner terminal 20, and the female outer terminal 40 covering the female inner housing 30. On an inner surface of the female outer housing 11, the female outer terminal 40, the female inner housing 30, and the female inner terminal 20 are arranged in this order from an outer side toward a center in a radial direction of the female connector 10.

The metal-made female inner terminal 20 is disposed at a radial center of the female connector 10, and is connected to the male inner terminal 204 of the male connector 200 when the female connector 10 and the male connector 200 are fitted to each other. Accordingly, electric signals from the core wire 301 of the coaxial cable 300 are transmitted to the core wire 101 of the coaxial cable 100 through the male inner terminal 204 and the female inner terminal 20.

The resin-made tubular female inner housing 30 covers the female inner terminal 20 in the radial direction, and serves as an insulating member that electrically insulates the female inner terminal 20 from the female outer terminal 40 on an outer side. The metal-made female outer terminal 40 covers an entire circumference of the female inner housing 30, and is crimped to the braid 103 of the coaxial cable 100 to be electrically connected to the braid 103. The female outer terminal 40 includes a contact spring 41 at a distal end. When the female connector 10 and the male connector 200 are fitted to each other, the contact spring 41 comes into contact with an inner surface of the male outer terminal 202 and is electrically connected to the male outer terminal 202. Accordingly, the braid 303 of the coaxial cable 300, the male outer terminal 202, the female outer terminal 40, and the braid 103 of the coaxial cable 100 are electrically connected to each other and serve as the ground, and noise of electromagnetic waves entering from outside through the coaxial cable 300 can be shielded.

Next, the female outer terminal 40 will be described in detail. The female outer terminal 40 has a substantially cylindrical shape by, for example, punching and bending a metal plate. The female outer terminal 40 includes a tubular portion 45 which is a cylindrical shape, a braid crimping piece (also simply referred to as "crimping piece") 43, and a sheath crimping piece 42. The tubular portion 45 includes an inner housing accommodating chamber 48 that is an accommodating chamber that can accommodate the female inner housing 30 therein, and accommodates the female inner housing 30. The braid crimping piece 43 is a metal piece crimped to the braid 103 of the coaxial cable 100. The sheath crimping piece 42 is a metal piece that is adjacent to the braid crimping piece 43 across a notch portion 44 in a longitudinal direction of the female outer terminal 40. A method for crimping will be described later.

The braid crimping piece 43 crimped to the braid 103 of the coaxial cable 100 includes a folded piece 43*a* obtained by folding back a part of the braid crimping piece 43. The braid crimping piece 43 extends from the tubular portion 45 in parallel to a radial direction of the tubular portion 45 and also extends in a length direction of the tubular portion 45 (the longitudinal direction of the female outer terminal 40). Here, since the folded piece 43*a* is folded back, the folded piece 43*a* extends in an opposite direction to a base portion extending from the tubular portion 45, and the braid crimping piece 43 has a larger size (thickness) in the radial direction at the folded piece 43*a*.

According to such a configuration, the folded piece 43*a* of the braid crimping piece 43 serves as a beam at the same time as crimping the braid 103 that is the outer conductor, so that the rigidity of the braid crimping piece 43 is improved. Accordingly, a repulsive force of the crimping is improved, and the bonding between the braid 103 and the female outer terminal 40 is maintained. Accordingly, opening of the female outer terminal 40 formed by bending a metal plate due to an external force received from the coaxial cable 100 can be prevented, and the cable holding strength by the female outer terminal 40 is improved.

The sheath 104 of the coaxial cable 100 covers a portion of the braid 103 excluding a distal end portion 105. The folded piece 43*a* is disposed between a braid fold (also simply referred to as "folded portion") 103*a* and the sheath 104. The braid fold 103*a* is a part of the distal end portion 105 of the braid 103 and is obtained by folding back the distal end portion 105 on the insulator 102 of the coaxial cable 100.

Accordingly, the braid crimping piece 43 is crimped to the braid 103 in a state in which the folded piece 43*a* is disposed between the braid fold 103*a* and the sheath 104 in a longitudinal direction of the coaxial cable 100, and thus the connection reliability between the braid 103 and the female outer terminal 40 can be improved. The braid fold 103*a* is folded back on a sleeve 106 attached to the coaxial cable 100 as described in an assembling method described later (see FIGS. 4C to 4G).

The female outer terminal 40 further includes a plate portion 46 extending from the tubular portion 45 in the length direction of the tubular portion 45 (see FIG. 3). The folded piece 43*a* is formed by folding back an end portion of the plate portion 46 (end portion of the female outer terminal 40 in the longitudinal direction).

Accordingly, the folded piece 43*a* can be formed by folding back the plate portion 46 of the female outer terminal 40, and thus manufacturing is easy. Specifically, the folded piece 43*a* is formed by folding back the end portion of the plate portion 46 that is obtained by cutting a metal plate constituting the female outer terminal 40 into a substantially L-shape, that is, a shape of the notch portion 44. Accordingly, when the female outer terminal 40 is manufactured by processing a metal plate, the folded piece 43*a* can be formed without wasting a part of the metal plate that corresponds to the notch portion 44.

Next, a method for assembling the female connector 10 will be described. FIGS. 4A to 4J show first to tenth steps of the assembling method. In the first step in FIG. 4A, the coaxial cable 100 is cut to a predetermined length. In the second step in FIG. 4B, the sheath 104 is peeled off to expose the braid 103. In the third step in FIG. 4C, the sleeve 106 is coated over and crimped to the braid 103.

Figure 4A:
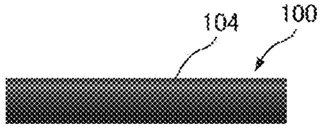
FIG. 4A shows a first step in a female connector assembling method according to the first embodiment.
Figure 4B:
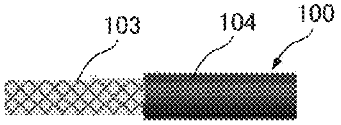
FIG. 4B shows a second step in the female connector assembling method.
Figure 4C:
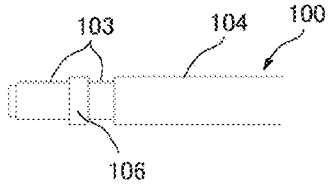
FIG. 4C shows a third step in the female connector assembling method.
Figure 4D:
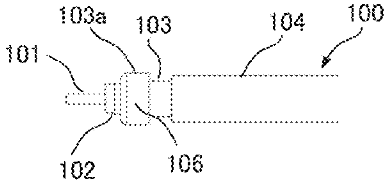
FIG. 4D shows a fourth step in the female connector assembling method.

In the fourth step in FIG. 4D, a distal end of the braid 103 is folded back toward and coated on the sleeve 106. A portion coated on the sleeve 106 is the braid fold 103*a*. After the folding, a portion of the exposed insulator 102 is removed to expose the core wire 101.

Figure 4E:
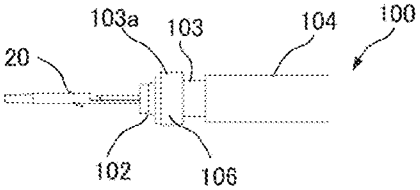
FIG. 4E shows a fifth step in the female connector assembling method.
Figure 4F:
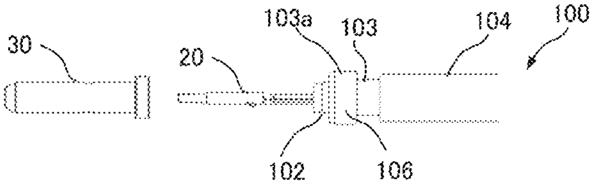
FIG. 4F shows a sixth step in the female connector assembling method.

In the fifth step in FIG. 4E, the female inner terminal 20 is attached (pressed) to the core wire 101. In the sixth step in FIG. 4F, the female inner terminal 20 is inserted into the female inner housing 30. The female inner terminal 20 includes a locking projection on an outer peripheral surface, and a position of the female inner terminal 20 is regulated relative to the female inner housing 30 by engaging the locking projection with a concave portion provided in an inner periphery of the female inner housing 30.

Figure 4G:
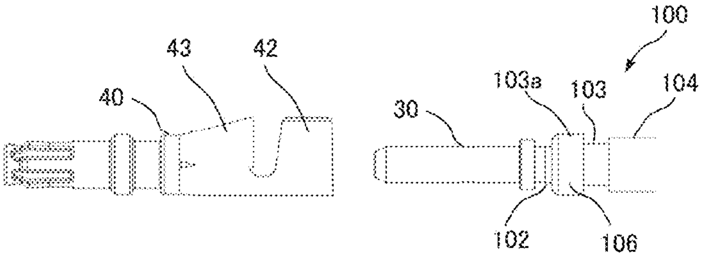
FIG. 4G shows a seventh step in the female connector assembling method.
Figure 5:
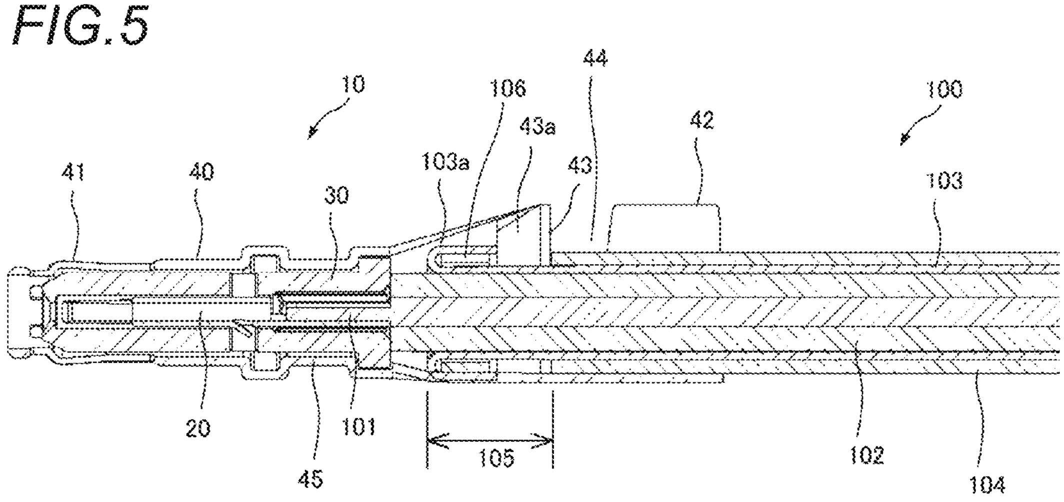
FIG. 5 is a longitudinal sectional view of the female connector before the braid crimping piece is crimped between the step in FIG. 4G and the step in FIG. 4H.

In the seventh step in FIG. 4G, the female inner housing 30 and the female inner terminal 20 therein are inserted into the inner housing accommodating chamber 48 of the female outer terminal 40. FIG. 5 shows the female connector 10 after the seventh step in FIG. 4G and before the braid crimping piece 43 is crimped.

Figure 4H:
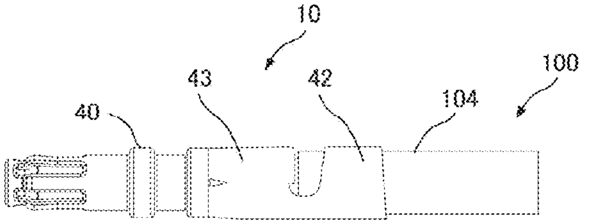
FIG. 4H shows an eighth step in the female connector assembling method.

In the eighth step in FIG. 4H, the state of FIG. 2 is implemented by crimping the sheath crimping piece 42 and the braid crimping piece 43 to the coaxial cable 100. At this time, as shown in FIGS. 5 and 2, the braid crimping piece 43 is crimped to the braid 103, and particularly, the folded piece 43*a* serves as a beam at the same time as crimping the braid 103, so that the rigidity of the braid crimping piece 43 is improved.

The folded piece 43*a* is disposed between the sheath 104 and the braid fold 103*a* formed in the fourth step in FIG. 4D. Accordingly, the braid crimping piece 43 is crimped to the braid 103 in a state in which the folded piece 43*a* is disposed between the braid folding 103*a* and the sheath 104, and thus the connection reliability between the braid 103 and the female outer terminal 40 can be improved.

Figure 4I:
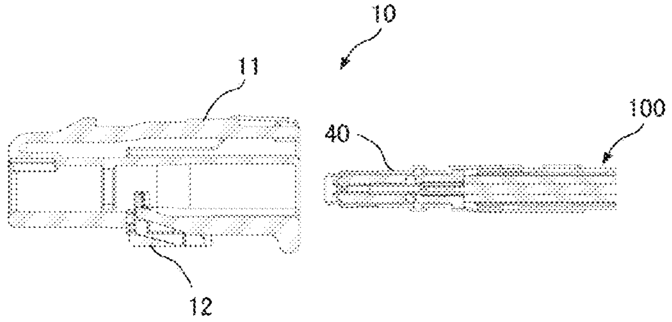
FIG. 4I shows a ninth step in the female connector assembling method.
Figure 4J:
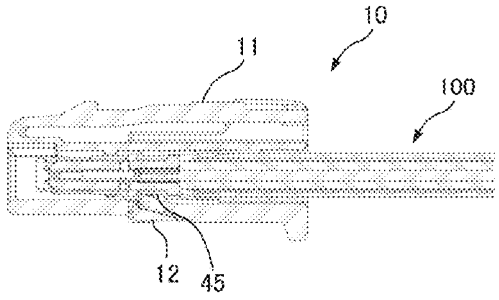
FIG. 4J shows a tenth step in the female connector assembling method.

In the ninth step in FIG. 4I, an assembly (the female connector 10) assembled up to FIG. 4H is inserted into the female outer housing 11. The assembly is held in the female outer housing 11 by locking a lance provided in the female outer housing 11 to the tubular portion 45 of the female outer terminal 40. In the tenth step in FIG. 4J, the displacement of the lance is prevented by installing the spacer 12 from the lower side of the female outer housing 11, and the female connector 10 is completed.

Second Embodiment

Figure 6:
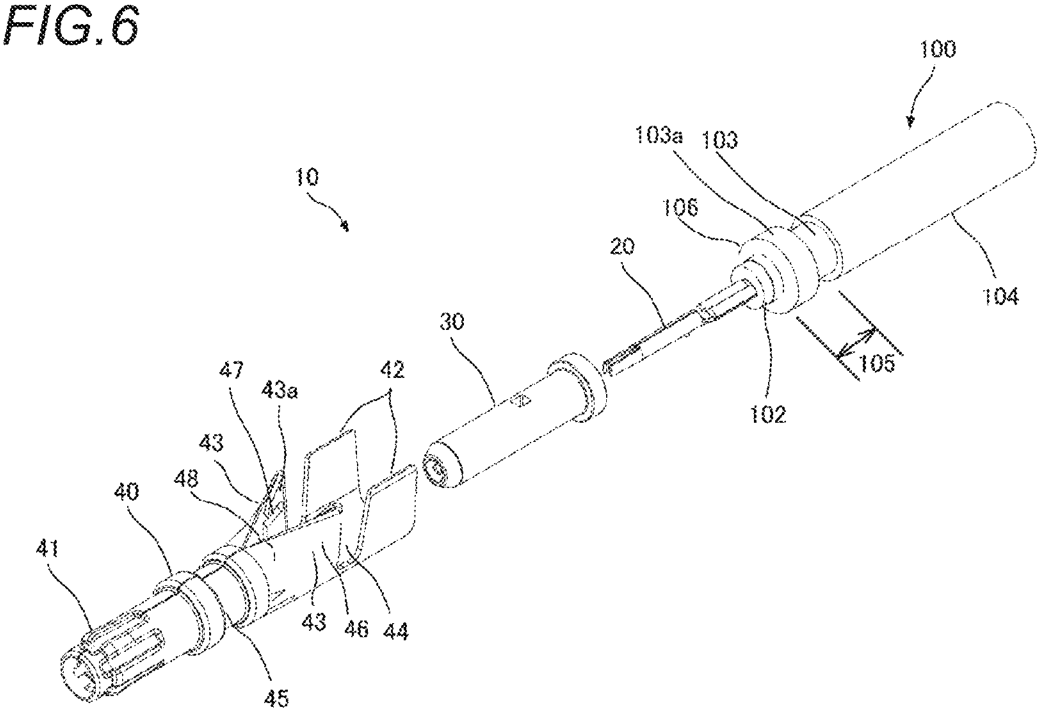
FIG. 6 is an exploded perspective view of a connector according to a second embodiment of the present disclosure.
Figure 7:
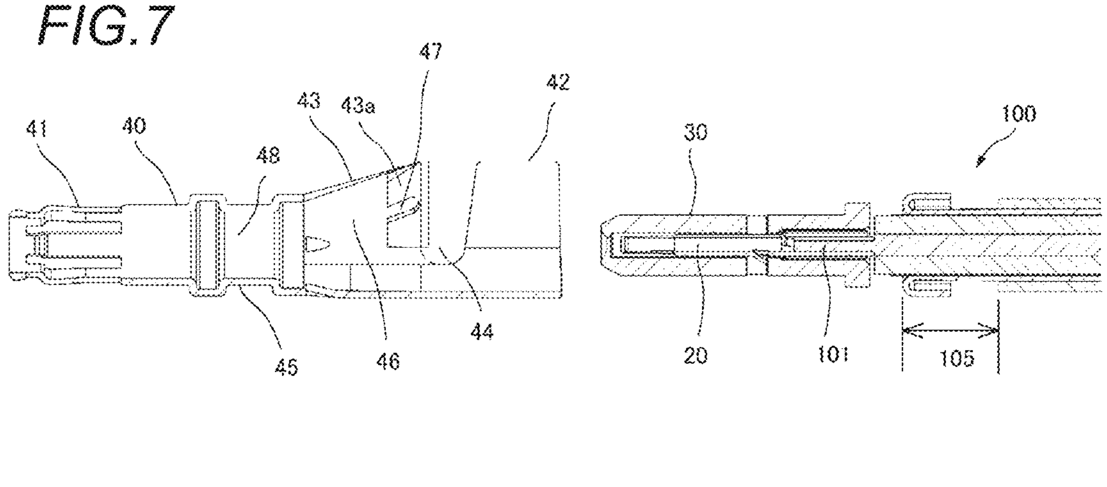
FIG. 7 is a longitudinal sectional view of the female connector before a female outer terminal is assembled according to the second embodiment.

FIGS. 6 and 7 show the female connector 10 according to a second embodiment. FIG. 6 corresponds to FIG. 3 according to the first embodiment. FIG. 7 corresponds to the sectional view in FIG. 4G. In the present embodiment, the folded piece 43*a* of the female outer terminal 40 is provided with a slit 47. The slit 47 has an elongated slot shape, and is provided along a folding-back direction of the folded piece 43*a*. The folded piece 43*a* is thinner at the slit 47, and is thus imparted with a spring property. Since the folded piece 43*a* has a spring property, the folded piece 43*a* easily bites into and is caught by the braid 103, whereby a holding force is further improved.

The present disclosure is not limited to the embodiments described above, and various modifications can be adopted within the scope of the present disclosure. For example, the present disclosure is not limited to the embodiments described above, and modifications, improvements, and the like can be appropriately made. In addition, materials, shapes, sizes, numbers, arrangement positions, and the like of components in the above-described embodiments are freely selected and are not limited as long as the present disclosure can be implemented. For example, in the above embodiments, the braid crimping piece 43 of the female outer terminal 40 has the folded piece 43*a*. Alternatively, a braid crimping piece of a male outer terminal may have a folded piece.

Here, features of the embodiments of the connector according to the present disclosure described above are briefly summarized and listed in the following first to fifth aspects.

According to a first aspect of the present disclosure, a connector (female connector 10) is attachable to an end of a cable (coaxial cable 100), and the cable includes an inner conductor (core wire 101), an insulator (102) that covers the inner conductor, and an outer conductor (braid 103) that covers the insulator. The connector (10) includes: an inner terminal (female inner terminal 20) attachable to the inner conductor; an insulating member (female inner housing 30) that covers the inner terminal; and an outer terminal (female outer terminal 40) that covers the insulating member. The outer terminal includes: a crimping piece (braid crimping piece 43) configured to be crimped to the outer conductor; and a folded piece (43*a*) configured by folding back a part of the crimping piece.

According to the connector having the configuration of the first aspect, the folded piece of the crimping piece serves as a beam at the same time as crimping the outer conductor, so that the rigidity of the crimping piece is improved. Accordingly, a repulsive force of the crimping is improved, and the bonding between the outer conductor and the outer terminal is maintained. Accordingly, the cable holding strength by the outer terminal is improved.

According to a second aspect of the present disclosure, in the connector of the first aspect, the cable includes a sheath (104) covering a portion of the outer conductor excluding a distal end portion (105) of the outer conductor. The folded piece is disposed between the sheath and a folded portion (braid fold 103*a*), the folded portion being a part of the distal end portion of the outer conductor and being configured by folding back the distal end portion on the insulator of the cable.

According to the connector having the configuration of the second aspect, the crimping piece is crimped to the outer conductor in a state in which the folded piece is disposed between the folded portion (braid fold) and the sheath, and thus the connection reliability between the outer conductor and the outer terminal can be improved.

According to a third aspect of the present disclosure, in the connector of the first aspect, the outer terminal includes a tubular portion (45) that accommodates the insulating member. The crimping piece includes a plate portion (46) extending from the tubular portion in a length direction of the tubular portion. The folded piece is formed by folding back an end portion of the plate portion.

According to the connector having the configuration of the third aspect, the folded piece can be formed by folding back the plate portion of the outer terminal, and thus manufacturing is easy.

According to a fourth aspect of the present disclosure, in the connector of any one of the first to third aspects, the folded piece includes a slit (47).

According to the connector having the configuration of the fourth aspect, the slit is provided in the folded piece to impart a spring property to the folded piece, so that the folded piece easily bites into and is caught by the outer conductor, thereby a holding force is further improved.

According to a fifth aspect of the present disclosure, in the connector of the fourth aspect, the slit is provided along a folding-back direction of the folded piece.

According to the connector having the configuration of the fifth aspect, the slit is provided in the folded piece to impart a spring property to the folded piece, so that the folded piece easily bites into and is caught by the outer conductor, thereby the holding force is further improved.

According to the present disclosure, the crimping piece of the outer terminal includes the folded piece obtained by folding back a part of the crimping piece. Accordingly, the bonding between the outer conductor and the outer terminal is maintained. Accordingly, the cable holding strength by the outer terminal is improved.

What is claimed is:

1. A connector attachable to an end of a cable, the cable including an inner conductor, an insulator that covers the inner conductor, and an outer conductor that covers the insulator, the connector comprising:

an inner terminal attachable to the inner conductor;

an insulating member that covers the inner terminal; and an outer terminal that covers the insulating member, wherein the outer terminal includes:

a crimping piece configured to be crimped to the outer conductor; and a folded piece configured by folding back a part of the crimping piece, by folding one end of the crimping piece in a longitudinal direction of the outer terminal, the folded piece extending along the longitudinal direction toward the other side in the longitudinal direction, such that a side surface of the folded piece opposes an outer peripheral surface, which extends along the longitudinal direction of the outer conductor.

2. The connector according to claim 1, wherein the cable includes a sheath covering a portion of the outer conductor excluding a distal end portion of the outer conductor, and the folded piece is disposed between the sheath and a folded portion, the folded portion being a part of the distal end portion of the outer conductor and being configured by folding back the distal end portion on the insulator of the cable.

3. The connector according to claim 1, wherein the outer terminal includes a tubular portion that accommodates the insulating member, the crimping piece includes a plate portion extending from the tubular portion in a length direction of the tubular portion, and the folded piece is formed by folding back an end portion of the plate portion.

4. The connector according to claim 1, wherein the folded piece includes a slit.

5. The connector according to claim 4, wherein the slit is provided along a folding-back direction of the folded piece.

* * * * *